United States Patent [19]

Hayashi et al.

[11] Patent Number: 4,952,537

[45] Date of Patent: Aug. 28, 1990

[54] CERAMIC PRODUCTS AND PROCESS FOR PRODUCING THE SAME

[75] Inventors: Koichi Hayashi, Kanagawa; Takeshi Suzuki, Kanagawa, both of Japan

[73] Assignee: Toto, Ltd., Fukuoka, Japan

[21] Appl. No.: 173,445

[22] Filed: Mar. 25, 1988

[30] Foreign Application Priority Data

Mar. 26, 1987 [JP] Japan .................................. 62-72671
Mar. 26, 1987 [JP] Japan .................................. 62-72672

[51] Int. Cl.$^5$ ............................................ C04B 35/10
[52] U.S. Cl. .................................. 501/127; 501/153; 264/66
[58] Field of Search ................. 501/127, 153, 132; 264/66

[56] References Cited

U.S. PATENT DOCUMENTS

| | | |
|---|---|---|
| 3,377,178 | 4/1968 | Miller et al. ........................ 501/127 |
| 3,725,094 | 4/1973 | Levy, Jr. et al. .................... 501/127 |
| 3,862,845 | 1/1975 | Manigault .......................... 501/127 |
| 3,871,891 | 3/1975 | Schuller et al. ..................... 501/127 |
| 4,019,914 | 4/1977 | Esper et al. ........................ 501/127 |
| 4,126,654 | 11/1978 | Montgomery et al. ............. 501/127 |
| 4,418,024 | 11/1983 | Prochazka et al. ................ 501/128 |
| 4,427,785 | 1/1984 | Prochazka et al. ................ 501/128 |
| 4,595,665 | 6/1986 | Takayama et al. ................. 501/127 |
| 4,762,655 | 8/1988 | Rhodes et al. ..................... 501/127 |

FOREIGN PATENT DOCUMENTS

| | | | |
|---|---|---|---|
| 0152768 | 8/1985 | European Pat. Off. ............ 501/127 |
| 0168606 | 1/1986 | European Pat. Off. ............ 501/127 |
| 54-043909 | 4/1979 | Japan .................................. 501/127 |
| 59-097572 | 6/1984 | Japan . | |
| 61-291449 | 12/1986 | Japan . | |

OTHER PUBLICATIONS

Bradt, "Cr$_2$O$_3$ Solid Solution Hardening of Al$_2$O$_3$", Journal of American Ceramic Society, vol. 50, No. 1, pp. 54–55, 1967.

Chemical Abstract, vol. 101, No. 18, 29 Oct. 1984, p. 128, Abs. 154244y–A process for producing polycrystalline synthetic ruby.

Transactions and Journal of the British Ceramic Society, vol. 81, No. 5, Sep./Oct. 1982, pp. 148–151, by Sclosa et al., "Fracture Toughness of Hot Isostatically Pressed Alumina."

Primary Examiner—Mark L. Bell
Assistant Examiner—Anthony J. Green
Attorney, Agent, or Firm—Pretty, Schroeder, Brueggemann & Clark

[57] ABSTRACT

A process for producing a ceramic product comprises the steps of adding, as desired, chromium salt and magnesium salt to aluminum salt as starting materials, calcining the salts to obtain fine powder mixture of metal oxides which comprises alumina as a main component, forming the powder mixture into a desired shape of body, and sintering and hot isostatically pressing the formed body.

8 Claims, 4 Drawing Sheets

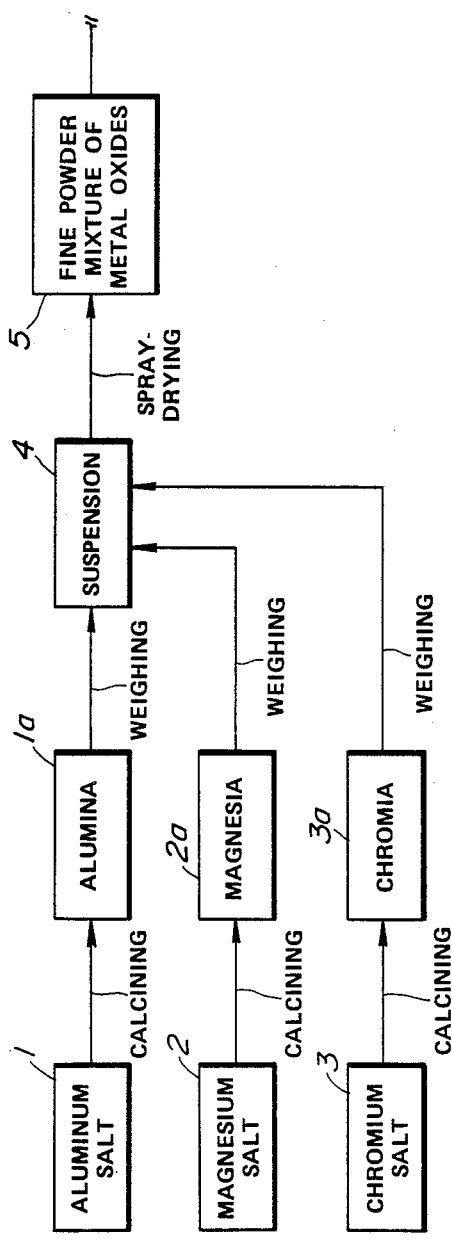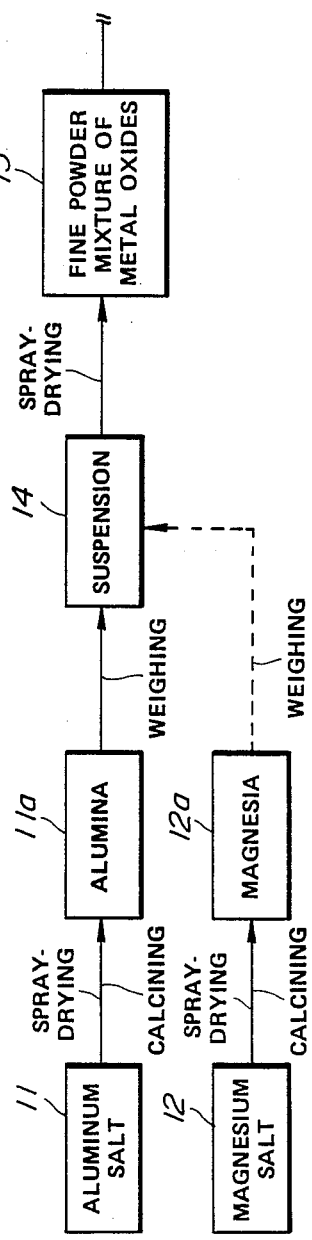

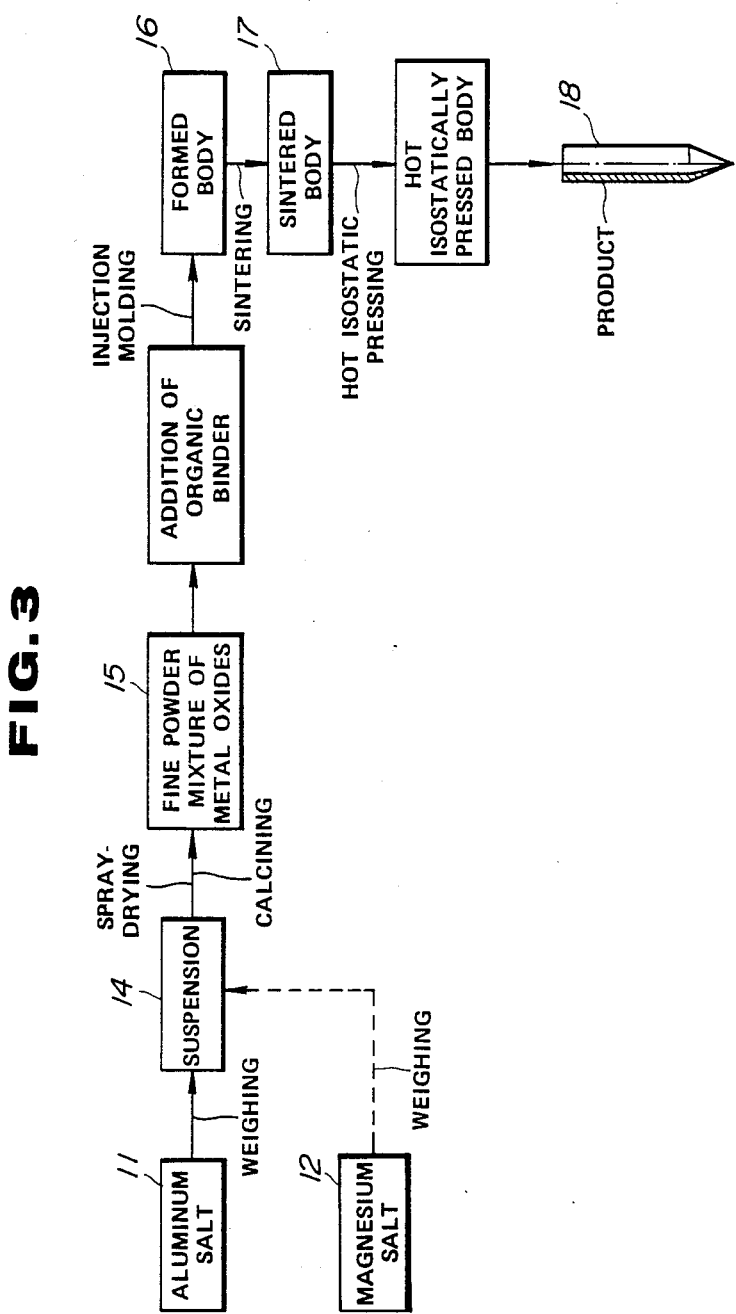

FIG.5

| No. | wt. % Cr₂O₃ | wt. % MgO | Dura | Mach | Pore of 1 μm | Size of 4 μm | Tr | Av-Sz (μm) | I (kg/mm²) | H (Hv) | Dens | Cond. Cal/cm-sec-°C |
|---|---|---|---|---|---|---|---|---|---|---|---|---|
| P1 | 1.0 | 0.0 | A | A | NON | NON | Good | < 2.0 | 53 | 2,050 <H | 3.99 | 0.07 |
| P2 | 0.7 | 0.03 | A | A | NON | NON | Good | < 1.3 | 85 | 2,050 <H | 3.99 | 0.08 |
| P3 | 1.5 | 0.03 | A | A | NON | NON | Good | < 1.4 | 73 | 2,050 <H | 3.99 | 0.08 |
| P4 | 3.0 | 0.03 | A | A | NON | NON | Good | < 1.4 | 82 | 2,050 <H | 3.99 | 0.08 |
| P5 | 1.5 | 0.05 | A | A | NON | NON | Good | < 1.1 | 80 | 2,050 <H | 3.99 | 0.08 |
| P6 | 1.5 | 0.01 | A | A | NON | NON | Good | < 1.3 | 77 | 2,050 <H | 3.99 | 0.08 |
| P7 | 0.0 | 0.05 | A | A | NON | NON | Good | < 1.5 | 75 | 2,030 <H | 3.99 | 0.08 |
| P8 | 0.0 | 0.0 | A | A | NON | NON | Good | < 1.5 | 82 | 2,020 <H | 3.99 | 0.08 |
| P9 | 5.0 | 0.0 | B | B | BE | NON | Bad | < 2.0 | 51 | 2,000 <H | 4.00 | 0.06 |
| P10 | 1.5 | 1.0 | B | C | BE | NON | Bad | < 1.3 | 65 | 1,980 <H | 3.97 | 0.06 |
| P11 | 0.0 | 0.5 | C | C | BE | BE | Bad | < 8.0 | 47 | 1,860 <H | 3.96 | 0.06 |
| P12 | 0.0 | 0.05 | C | C | BE | BE | Bad | < 20.0 | 45 | 1,970 <H | 3.97 | 0.06 |

CERAMIC PRODUCTS AND PROCESS FOR PRODUCING THE SAME

BACKGROUND OF THE INVENTION

1. Field of the Invention

This invention relates to ceramic products, for example, precision ceramic products such as bonding capillary, optical connector, wire guide, etc., and a process for producing the same.

2. Description of the Relevant Art

There have been used ceramic products, for example, as a carrier of gold wires for connecting electrodes with fingers of a lead frame on a semiconductor chip surface.

Such ceramic products are obtained generally by preparing a starting powder mixture comprising primarily alumina ($Al_2O_3$) and additives such as chromia ($Cr_2O_3$), magnesia (MgO), strontia (SrO), yttria ($Y_2O_5$) or lantuna ($La_2O_3$), etc., forming and sintering the powder mixture.

Processes for producing such ceramic products noted above are disclosed in Japanese Patent Application Laid-Open Print Nos. 97572/1984 (laid open June 5, 1984) and 291449/1986 (laid open Dec. 22, 1986), for example.

The process disclosed in the former Print No. 97572/1984 comprises the steps of mixing 0.01 to 5.0 mol% of chromia and 0.01 to 0.5 mol% of magnesia as additives into alumina, forming the mixture and then sintering the formed body in a vacuum below $10^{-1}$ torr at a temperature ranging from 1,400° C. to 1,800° C., to thereby facilitate control of the sintering atmosphere and reduce the amount of the additives.

The process disclosed in the latter Print No. 291449/1986 comprises the steps of mixing magnesium chloride or magnesium sulfate in aqueous solution into fine powder of alumina in the proportion of 0.1 to 3.0 mol% thereof, forming the mixture after drying and granulation, and then sintering the formed body in a vacuum of $10^{-3}$ torr at a temperature ranging from 1,400° C. to 1,600° C. (or 1,350° C. to 1,550° C. when the sintered body is further hot isostatically pressed), to thereby uniformly deposit spinel ($MgAl_2O_4$) in the grain boundary layer of alumina whereby inhibiting abnormal growth of grains, so that pores remaining in the boundaries are reduced.

The products obtained by the process according to the former Print No. 97572/1984 have, however, a larger average grain size, resulting in inferior light transmissibility and hardness lower than 2000 HV, thus problems in machinability and mechanical durability would remain. On the other hand, in the process according to the latter Print No. 291449/1986, the sintering step should be performed in a vacuum, rendering the devices for performing the process large-scale. Further, in both of the Prints, there remain such drawbacks that the sintering steps are performed at high temperatures, respectively.

SUMMARY OF THE INVENTION

It is an object of the present invention to provide a ceramic product the grain sizes of which are fine and uniform, the sizes of possible pores remaining in the grain boundaries of which are restricted to small sizes, and which has a high hardness and superior light transmissibility, as well as a process for producing the same.

According to the present invention, there is also provided a ceramic product which is obtained by sintering alumina including 3.05 weight % or less additives, has its average grain size of alumina of 2.0 $\mu$m or less, sizes of grains of which are no more than 4.0 $\mu$m, sizes of pores remaining in the grain boundaries of which are no more than 0.1 $\mu$m, and which has hardness higher than 2,000 HV.

According to the present invention, there is also provided a process for producing a ceramic product, which comprises the steps of preparing alumina from alminum salt as starting materials, preparing uniform fine powder mixture of metal oxides by mixing additives to the alumina as desired, forming the powder mixture into a desired shape of body, sintering the formed body in a predetermined atmosphere at a temperature lower than convention and hot isostatically pressing the sintered body in a predetermined atmosphere under predetermined conditions.

BRIEF DESCRIPTION OF THE DRAWINGS

FIG. 2 is a block diagram showing a modification of the step for obtaining fine powder mixture in the first embodiment;

FIG. 3 is a block diagram showing the respective steps of the production process according to the second embodiment of the present invention;

FIG. 4 is a block diagram showing a modification of the step for obtaining fine powder mixture in the second embodiment; and FIG. 5 is a list showing the physical properties of the ceramic products obtained in the first and the second embodiments and the conventional products.

DESCRIPTION OF EMBODIMENTS

Figure 1:
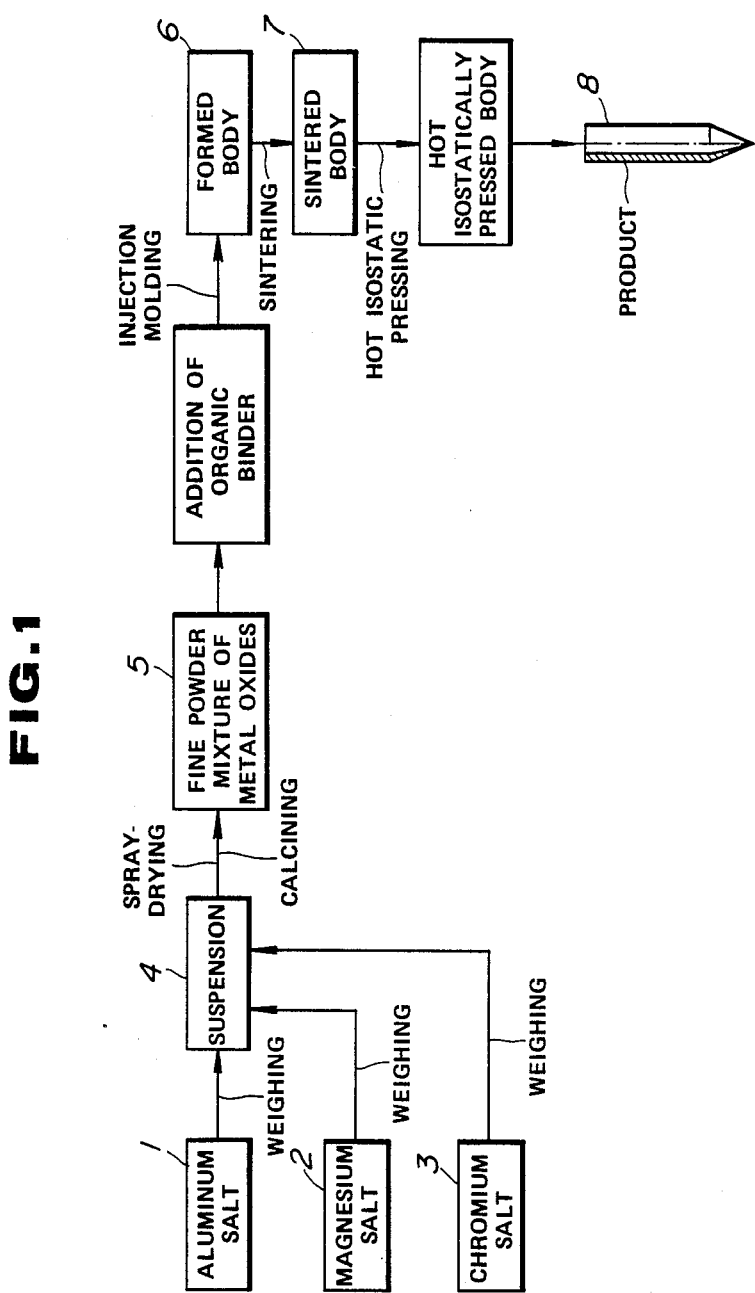
FIG. 1 is a block diagram showing the respective steps of the production process according to the first embodiment of the present invention.

The first embodiment according to the present invention is described hereinafter with referring to FIGS. 1 and 2.

In this embodiment, as starting materials, there are firstly prepared alminum salt 1, chromium salt 2 and magnesium salt 3, which change to alumina, chromia and magnesia of purities higher than 99.99 %, respectively, when spray dried and thereafter calcined. Concretely, for example, ammonium alum or aluminum ammonium carbonate hydroxide (AACH:$NH_4AlCO_3$·$(OH)_2$), chromium nitrate $Cr(NO_3)_2$ $9H_2O$ and magnesium nitrate $Mg(NO_3)_3$ $6H_2O$ may be used as the salts 1, 2 and 3, respectively.

The salts 1, 2 and 3 are weighed and once prepared into a suspension 4 in a mono pot mill with mono balls therein, such as nylon balls. The suspension 4 is spray-dried to obtain fine powder mixture of the salts, and this powder mixture is then calcined at a temperature ranging from 500° C. to 1,050° C., for example at 780° C., for 2 hours, to obtain uniform fine powder mixture 5 of metal oxides, i.e., alumina, chromia and magnesia. The fine powder mixture 5 may be milled in a solvent such as ethanol to break possible agglomerates in the mixture 5, and thereafter spray dried again, if necessary. The fine powder mixture 5 contains from 0.7 weight % to 3.0 weight % chromia and from 0 (zero) to 0.05 weight % magnesia balance alumina. Magnesia is not necessarily included in the mixture 5.

As shown in FIG. 2, the above noted fine powder mixture 5 of metal oxides may be also prepared by firstly spray drying and calcining the salts 1, 2 and 3 to separately obtain alumina 1a, magnesia 2a and chromia 3a, and thereafter weighing and mixing them likewise to the above.

To the thus obtained fine powder mixture 5 of metal oxides is added an organic binder which is composed of thermoplastic resin as a main component, and then the mixture 5 is formed into a desired shape of body 6 by injection molding.

The formed body 6 is sintered in air at a temperature ranging from 1,280° C. to 1,300° C., in a vacuum ranging from $10^{-6}$ torr to $10^{-3}$ torr, or in one of $N_2$, Ar and/or $H_2$, after resin extraction from the body 6. When in air, the temperature is raised, for example, at the rate of 200° C. an hour, and held at 800° C. and 1,295° C. for 1 hour, respectively.

The sintered body 7 is hot isostatically pressed in argon under a pressure ranging 1,000 atm. to 2,000 atm. at a temperature ranging from 1,300° C. to 1,310° C. for 1 hour, and thereafter precisely ground and polished by means of diamond paste, to obtain a final ceramic product 8 which is a bonding capillary, here.

With respect now to FIGS. 3 and 4, the second embodiment according to the present invention will be described hereinafter.

In this embodiment, as starting materials, there is firstly prepared alminum salt 11 solely, or together with magnesium salt 12, which change to alumina and magnesia of purities higher than 99.99 %, respectively, when spray-dried and thereafter calcined. Likewise to the first embodiment, as starting materials, ammonium alum or aluminum ammonium carbonate hydroxide (AACH:$NH_4AlCO_3(OH)_2$) and magnesium nitrate $Mg(NO_3)_3 \cdot 6H_2O$ may be used as the salts 11 and 12, respectively. In case that the magnesium salt 12 is mixed to the alminum salt 11, the former salt 12 is weighed to the amount of 0.05 weight % or less in terms of magnesia.

The aluminum salt 11 is solely, or together with the magnesium salt 12, prepared into a suspension 14 in the same manner with the first embodiment. The suspension 14 is spray-dried to obtain fine powder of the salt 11 or fine powder mixture of the salts 11 and 12, and this powder or powder mixture is then calcined to obtain uniform fine powder mixture 15 of metal oxides, i.e., solely alumina or alumina and magnesia, again in the same manner with the first embodiment. The fine powder mixture 15 may be also prepared, as shown in FIG. 4, by firstly spray-drying and calcining the salts 11 and 12 to separately obtain fine powder 11a of alumina and fine powder 12a of magnesia, and thereafter weighing and mixing them likewise to the above.

The fine powder mixture 15 may be milled by means of a solvent such as ethanol to break possible agglomerates in the mixtures 15, and thereafter spray-dried again, if necessary. Further, to the mixture 15 is added an organic binder which is composed of thermoplastic resin as a main component, and then the mixture 15 is formed into a desired shape of body 16 by injection molding.

The formed body 16 is sintered after debinding, to obtain a sintered body 17, which is hot isostatically pressed, under the same conditions with the first embodiment, and thereafter precisely ground and polished by means of diamond paste, to obtain a final ceramic product 18 which is a bonding capillary, here.

With referring next to FIG. 5, there are compared physical properties of test pieces $P_1$ to $P_8$ of ceramic products produced by means of one of the processes according to the first and second embodiments of the present invention with those of test pieces $P_9$ to $P_{12}$ of ceramic products produced by conventional processes.

In FIG. 5, the test pieces P1–P6 are produced by means of the process shown in the first embodiment, the test pieces P7 and P8 by means of the process shown in the second embodiment, and the test pieces P9–P12 by the conventional processes as described below.

The test pieces P9–P11 are obtained by preparing formed bodies each comprising a uniform mixture of alumina, chromia and magnesia, and sintering the formed bodies at a temperature ranging from 1,400° C. to 2,000° C. in a vacuum lower than $10^{-1}$ torr. Particularly, for the test piece 11, alumina as starting material is obtained by the Bayer methods, and a formed body is sintered at 1,575° C. for 1 hour, and then hot isostatically pressed in argon at 1,500° C. under a pressure of 1,000 atm. for 1 hour. For the test piece 12, 99.3% alumina is used, and a formed body is sintered at 1,575° C. for 1 hour and then hot isostatically pressed in argon at 1,500° C. under a pressure of 1,000 atm. for 1 hour.

The test for durability (Dura) is performed by making a ultrasonic type bonding capillary on trial, repeating wire bonding 200,000 times and then washing the capillary with aqua regia. The surface of the tip end is observed by an electron microscope (x400 magnification), and if there is no wear in the test piece it is rated A, and if slight wear is addmitted it is rated B. The test piece which has defects and/or chipping is rated C.

The test for machinability (Mach) is performed by grinding and polishing test pieces by a precise grinding and polishing machine rotating at 60 rpm under a load of 500gf, as follows.

Grinding: in water, with metal bond diamond of 200# on whetstone for 10 min.

Polishing: in oil, with 8 $\mu$m sized diamond paste on earthenware plate for 10 min.

Polishing: in oil, with 1 $\mu$m sized diamond paste on copper plate for 20 min.

Polishing: in oil, on diamond paste buff of 0.5 $\mu$m for 10 min.

Where the ground and polished surface of the test piece becomes mirror-surface it is rated as A, if damages remain partially, as B, and in case that chipping is remarkable, as C.

For pores of diameters of 0.1 $\mu$m or more and grain size of 4.0 $\mu$m or more, if there is no such pores in the test piece or such large sized grain, it is rated as NON, and in case that there exists such pore or large sized grain, as BE.

Translucence (Tr) is checked by looking through if the letters on a newspaper placed at a distance of 1 cm apart are readable through a sintered body sliced and polished into a thickness of 0.3 mm, and test pieces are rated as Good when readable, and as Bad when not readable.

Further, average grain size (Av-Sz), three point flexure strength I, Vickers hardness H, density (Dens) and thermal conductivity (Cond) of the test pieces are also shown in FIG. 5, in which flexure strength I and Vickers hardness H are measured at room temperature.

As is apparent from FIG. 5, the present products are improved to great extent in durability, machinability, hardness and translucence, etc. Various reasons for the improvements are given below.

Because aluminum salt is adopted as the starting material, sintering step can be performed even at a lower temperature. In other words, since almost pure alumina obtained by calcining aluminum salt results in having its surface activated, sintering can be completed at lower temperature. Such sintering at low temperature inhibits abnormal growth of grains so that grain sizes remains uniform and fine, even without addition of magnesia.

The step of hot isostatic pressing gives rise to lattice strains in the body, whereby a hardness of the body can be enhanced. Particularly, since the sintering is performed at a temperature higher than 1,280° C. and the hot isostatic pressing is performed at a temperature higher than 1,300° C. under a pressure higher than 1,000 atm., pores of 0.1 μm or more will not remain. Since the sintering is performed at a temperature lower than 1,350° C. and the hot isostatic pressing is performed at a temperature lower than 1,310° C. under a pressure lower than 2,000 atm., sizes of grains remain no more than 4.0 μm.

Particularly, when a polycrystalline artificial ruby is produced with addition of chromium, chromium is liable to be self-dispersed on material surface to form an oxide coating layers enriched in chromium on the surface of the ceramics product, to improve hardness and corrosion resistance. However, if the proportion of chromia is 0.7 weight % or less, no desired hardness and corrosion resistance can be obtained, while at a level of 3 weight % or more, pores of 0.1 μm or more will remain in the product even after hot isostatic pressing, whereby no desired toughness and strength can be expected. Thus, it is preferable to control the proportion of chromia (or chromium salt calculated in terms of chromia) in a range of 0.7 to 3.0 weight % (while treating the mixture of alumina, chromia and magnesia as 100 weight %).

The radius of chromium ion is approximately equal to that of aluminum ion (with difference by about 12%), and therefore chromium ions substitute for aluminum ions during sintering, whereby lattice strains occur to improve hardness, which does not occur unless otherwise hot isostatic pressing is performed.

Thus, according to the processes of the present invention, it becomes possible to obtain a ceramic product sizes of grains of which are uniform, and which has excellent translucence, excellent strength, hardness and machinability, and has dense and fine structure.

What is claimed is:

1. A ceramic sintered product consisting essentially of grains in a solid solution state, the grains consisting essentially of 0.7 to 3.0 weight % chromia and not more than 0.05 weight % magnesia and the balance alumina, wherein the sizes of said grains are no greater than 4.0 μm, and said grains have an average grain size no greater than 2.0 μm, the sizes of pores remaining in the interior of said product being less than 0.1 μm, and wherein said product has a hardness greater than 2,000HV and a density of 3.99 gm/cm$^3$.

2. A process for producing a ceramic product, comprising the steps of:
preparing a uniform fine powder mixture of metal oxides consisting essentially of 0.7 to 3.0 weight % chromia and 0.05 weight % or less magnesia and the balance alumina;
adding an organic binder consisting of thermoplastic resin to said uniform fine powder mixture;
sintering the mixture of the last recited step at a temperature of at least 1,280° C, and less than 1,350° C., to obtain a sintered body; and
hot isostatically pressing said sintered body at a temperature of 1,300° C. to 1,310° C. under a pressure of 1,000 atm. to 2,000 atm to produce a density of at least 3.99 gm/cm$^3$.

3. A process according to claim 2, wherein:
said step of preparing said fine powder mixture of metal oxides comprises the steps of:
preparing a suspension of aluminum salt, chromium salt and magnesium salt;
spray drying said suspension to obtain fine powder mixture of said salts; and
calcining said fine powder mixture of said salts to obtain said fine powder mixture of said metal oxides.

4. A process according to claim 2, wherein:
said sintering step is performed in a vacuum of $10^{-6}$ torr to $10^{-3}$ torr, or in one of $N_2$, Ar or $H_2$.

5. A ceramic product consisting essentially of grains in a solid solution state, the grains consisting essentially of less than 0.05 weight % magnesia and the balance alumina,
wherein the sizes of said grains are no greater than 4.0 μm, and said grains have an average grain size no greater than 2.0 μm,
the sizes of pores remaining in the interior of said product being less than 1 μm, and
wherein said product is translucent, has a hardness greater than 2,000 HV, a flexural strength of at least 70 kg/mm$^2$ and a density of at least 3.99 gm/cm$^3$.

6. A process for producing a ceramic product, comprising the steps of:
preparing a uniform fine powder mixture of metal oxides comprising alumina only or 0.05 weight % or less magnesia and the balance alumina;
adding an organic binder consisting of thermoplastic resin to said uniform fine powder mixture;
sintering the mixture of the last recited step at a temperature of at least 1,280° C. and less than 1,350° C. to obtain a sintered body; and
hot isostatically pressing said sintered body at a temperature of 1,300° C. to 1,310° C. under pressure of 1,000 atm. to 2,000° atm.

7. A process according to claim 6, wherein:
said preparing step of said fine powder mixture of metal oxides comprises the steps of:
spray drying a suspension of aluminum salt to obtain fine powder of aluminum salt; and
calcining said fine powder of aluminum salt to obtain fine powder of alumina.

8. A process according to claim 6, wherein:
said sintering step is performed in a vacuum of $10^{-6}$ torr to $10^{-'}$torr, or in one of $N_2$, Ar or $H_2$.

* * * * *

UNITED STATES PATENT AND TRADEMARK OFFICE
CERTIFICATE OF CORRECTION

PATENT NO.   :   4,952,537

DATED        :   August 28, 1990

INVENTOR(S)  :   Koichi Hayashi et al.

It is certified that error appears in the above-identified patent and that said Letters Patent is hereby corrected as shown below:

Column 1, line 68, "obtain®d" should read --obtained--.

Column 6, line 60, "10- torr" should read --$10^{-3}$ torr--.

Signed and Sealed this

Thirty-first Day of March, 1992

*Attest:*

HARRY F. MANBECK, JR.

*Attesting Officer*   *Commissioner of Patents and Trademarks*